(12) United States Patent
Hatsuzawa et al.

(10) Patent No.: US 12,173,666 B2
(45) Date of Patent: Dec. 24, 2024

(54) THROTTLE VALVE CONTROL DEVICE

(71) Applicant: Hitachi Astemo, Ltd., Hitachinaka (JP)

(72) Inventors: Hidefumi Hatsuzawa, Hitachinaka (JP); Hiroyuki Ota, Hitachinaka (JP); Takuya Tanaka, Hitachinaka (JP); Makoto Kawano, Hitachinaka (JP); Yoshihiko Akagi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/557,767

(22) PCT Filed: Feb. 2, 2022

(86) PCT No.: PCT/JP2022/003961
§ 371 (c)(1),
(2) Date: Oct. 27, 2023

(87) PCT Pub. No.: WO2022/264483
PCT Pub. Date: Dec. 22, 2022

(65) Prior Publication Data
US 2024/0218840 A1    Jul. 4, 2024

(30) Foreign Application Priority Data

Jun. 16, 2021    (JP) .................................. 2021-100013

(51) Int. Cl.
*F02D 9/10*    (2006.01)
*F02D 11/10*    (2006.01)

(52) U.S. Cl.
CPC ............ *F02D 9/1035* (2013.01); *F02D 11/10* (2013.01); *F02D 2011/101* (2013.01)

(58) Field of Classification Search
CPC .. F02D 9/1035; F02D 11/10; F02D 2011/101; F02M 3/10
(Continued)

(56) References Cited

U.S. PATENT DOCUMENTS

2002/0152988 A1    10/2002    Michels
2019/0107034 A1    4/2019    Hatsuzawa et al.

FOREIGN PATENT DOCUMENTS

JP    58-1758 U    1/1983
JP    11-343878 A    12/1999
(Continued)

OTHER PUBLICATIONS

JP-2002309967-A (Michels, M) (Oct. 23, 2002) (Machine Translation) (Year: 2002).*

(Continued)

*Primary Examiner* — Mahmoud Gimie
(74) *Attorney, Agent, or Firm* — Crowell & Moring LLP

(57) ABSTRACT

An object of the present application invention is to provide a throttle valve control device capable of effectively cooling a bearing of a throttle shaft while preventing an increase in size of a throttle body. Therefore, in a throttle valve control device in which flow paths 5T1 to 5T3 through which a heat exchange medium flows are formed in a throttle body 5, the diameter of a first bearing 8 of a throttle shaft 3 is greater than the diameter of a second bearing 9, the flow paths 5T1 to 5T3 are disposed along an outer periphery of an intake passage 1 to overlap with the second bearing 9 when viewed from a flow direction of the intake passage 1, and an inlet portion 5T1 and the outlet portion 5T3 of the flow paths 5T1 to 5T3 are disposed to sandwich the first bearing 8.

5 Claims, 7 Drawing Sheets

(58) Field of Classification Search
USPC .......................................................... 123/337
See application file for complete search history.

(56) References Cited

FOREIGN PATENT DOCUMENTS

| JP | 2002309967 A * | 10/2002 | ............... F02D 9/10 |
| JP | 2014-136964 A | 7/2014 | |
| WO | WO-2017179392 A1 * | 10/2017 | ................ F01P 3/14 |

OTHER PUBLICATIONS

WO-2017179392-A1 (Hatsuzawa et al.) (Oct. 19, 2017) (Machine Translation) (Year: 2017).*
International Search Report (PCT/ISA/210) issued in PCT Application No. PCT/JP2022/003961 dated Mar. 29, 2022 with English translation (4 pages).
Japanese-language Written Opinion (PCT/ISA/237) issued in PCT Application No. PCT/JP2022/003961 dated Mar. 29, 2022 with English translation (7 pages).
International Preliminary Report on Patentability (PCT/IB/338 & PCT/IB/373) issued in PCT Application No. PCT/JP2022/003961 dated Dec. 28, 2023, including English translation of Written Opinion (PCT/ISA/237) (6 pages).

* cited by examiner

THROTTLE VALVE CONTROL DEVICE

TECHNICAL FIELD

The present invention relates to a throttle valve control device that adjusts a flow rate of a fluid in an internal combustion engine. In particular, a throttle valve control device is attached to an intake passage of an internal combustion engine, and is used to adjust an amount of air taken into a cylinder in a gasoline engine vehicle, and to control pressure in an intake pipe in a diesel engine by variably controlling a passage cross-sectional area of the intake passage. Note that a gasoline engine vehicle uses both a so-called in-cylinder direct fuel injection type engine that directly injects a fuel into a cylinder and a so-called port injection type engine that injects a fuel into an intake pipe.

BACKGROUND ART

In particular, in an engine including a turbocharger, intake air is pressurized by the turbocharger, so that an intake air temperature increases. Therefore, an intercooler is provided downstream of the turbocharger to cool the intake air having the increased temperature.

In this case, when the intercooler is located downstream of a throttle body, high-temperature intake air before being cooled passes through the throttle body. Therefore, there is a problem that heat resistance of a bearing of the throttle body is insufficient. For example, as disclosed in PTL 1, a technique in which a cooling water flow path is provided to protect a component is known.

CITATION LIST

Patent Literature

PTL 1: WO 2017/179392 A

SUMMARY OF INVENTION

Technical Problem

However, in the configuration disclosed in PTL 1, since the cooling water flow path is provided to overlap with the bearing of the throttle body when viewed from an air flow direction, there is a problem that the throttle body becomes large in the air flow direction.

The present invention has been made in view of the above problems, and an object thereof is to provide a throttle valve control device capable of effectively cooling a bearing of a throttle shaft while preventing an increase in size of a throttle body.

Solution to Problem

In order to achieve the above object, according to the present invention, a throttle valve control device includes a throttle body in which an intake passage through which intake air flows is formed, a throttle valve that adjusts an amount of air passing through the intake passage, a throttle shaft fixed to the throttle valve, and a first bearing and a second bearing that rotatably support the throttle shaft. A flow path through which a heat exchange medium flows is formed in the throttle body, a diameter of the first bearing is greater than a diameter of the second bearing, the flow path is disposed along an outer periphery of the intake passage to overlap with the second bearing when viewed from a flow direction of the intake passage, and an inlet portion and an outlet portion of the flow path are disposed to sandwich the first bearing.

According to the present invention configured as described above, the flow path through which the heat exchange medium flows is disposed along the outer periphery of the intake passage to overlap with the second bearing when viewed from the flow direction of the intake passage. Thus, it is possible to uniformly cool the outer periphery of the intake passage and effectively cool the second bearing. In addition, since the inlet portion and the outlet portion of the flow path are disposed to sandwich the first bearing, it is possible to effectively cool the first bearing. In addition, since the flow path is disposed not to overlap with the first bearing having a large diameter, it is possible to prevent an increase in the dimension of the throttle body in the flow direction of the intake passage.

Advantageous Effects of Invention

According to the throttle valve control device according to the present invention, it is possible to effectively cool the bearing of the throttle shaft while preventing an increase in size of the throttle body.

DESCRIPTION OF EMBODIMENTS

Hereinafter, embodiments of the present invention will be described with reference to the accompanying drawings. Note that, in the present specification and the attached drawings, components having substantially the same functions or configurations are designated by the same reference signs, and repetitive description will be appropriately omitted.

First Embodiment

A throttle valve control device according to a first embodiment of the present invention will be described with reference to FIGS. 1 to 8. In the present embodiment, the present invention is applied to a motor-driven type throttle valve control device used in a gasoline engine vehicle.

Figure 1:
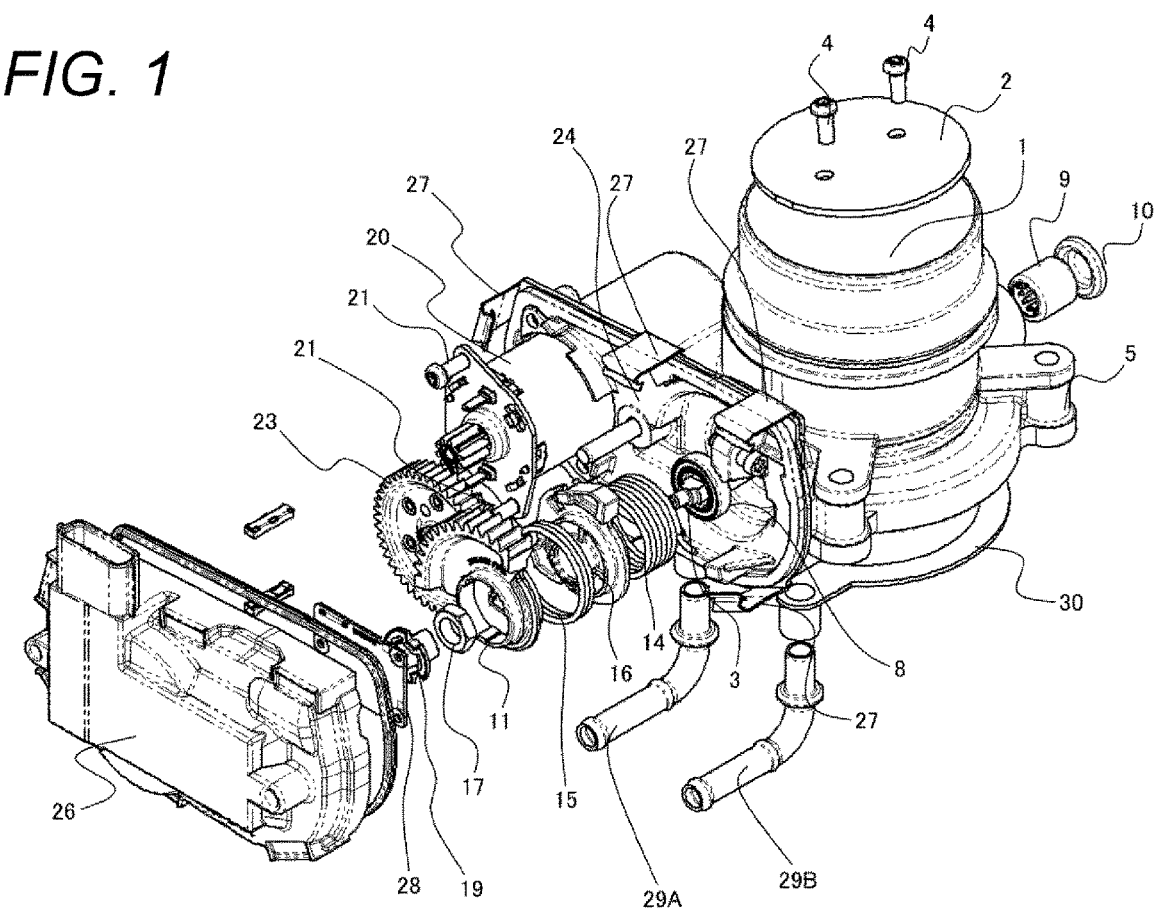
FIG. 1 is an exploded perspective view of a motor-driven type throttle valve control device used in a gasoline engine vehicle.

As illustrated in FIG. 1, a throttle body 5 forms a bore 1. The bore 1 is an intake passage through which intake air flows. As illustrated in FIG. 3, groove portions 5T1 to 5T3 are disposed in the throttle body 5 to surround the outer periphery of the bore 1. The groove portions 5T1 to 5T3 and a plate 30 (see FIGS. 1 and 2) form a cooling water passage (flow path). Here, an inlet-side cooling water pipe 29A and an outlet-side cooling water pipe 29B fixed to the throttle body 5 by press-fitting are connected to the cooling water passage. The inlet-side cooling water pipe 29A and the outlet-side cooling water pipe 29B are interfaces with a mating hose.

Figure 2:
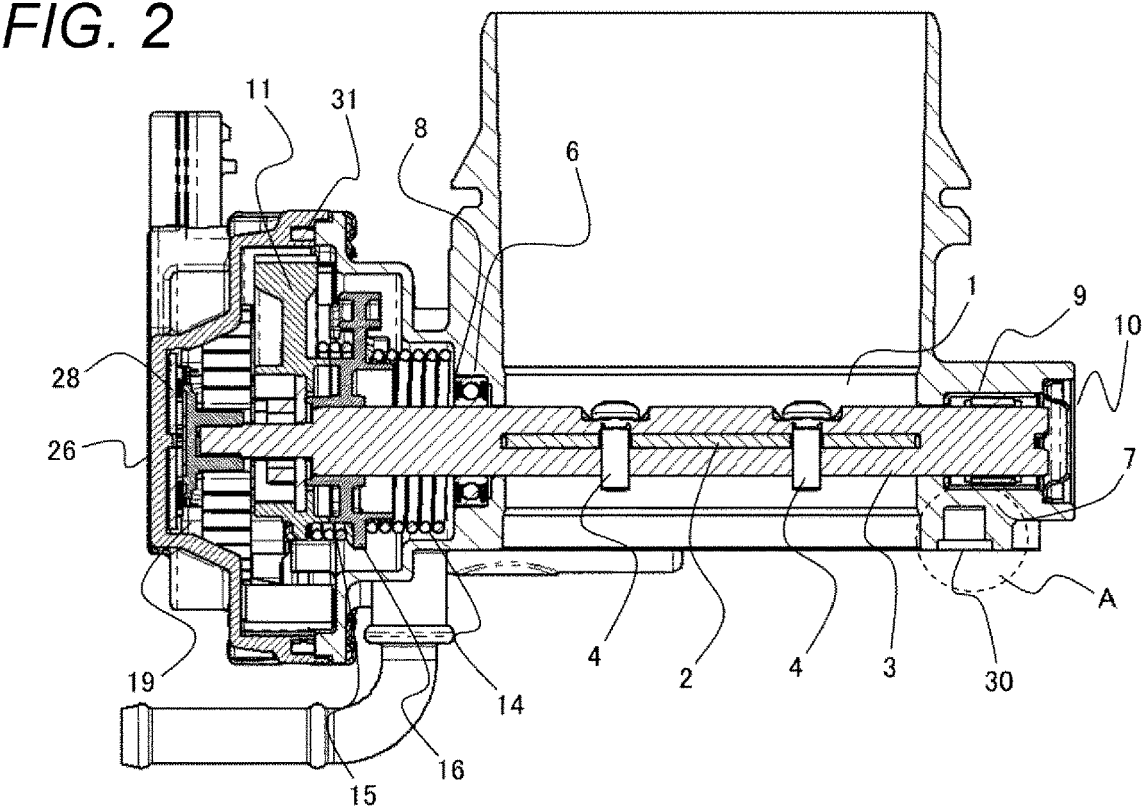
FIG. 2 is a cross-sectional view of the motor-driven type throttle valve control device used in the gasoline engine vehicle.
Figure 3:
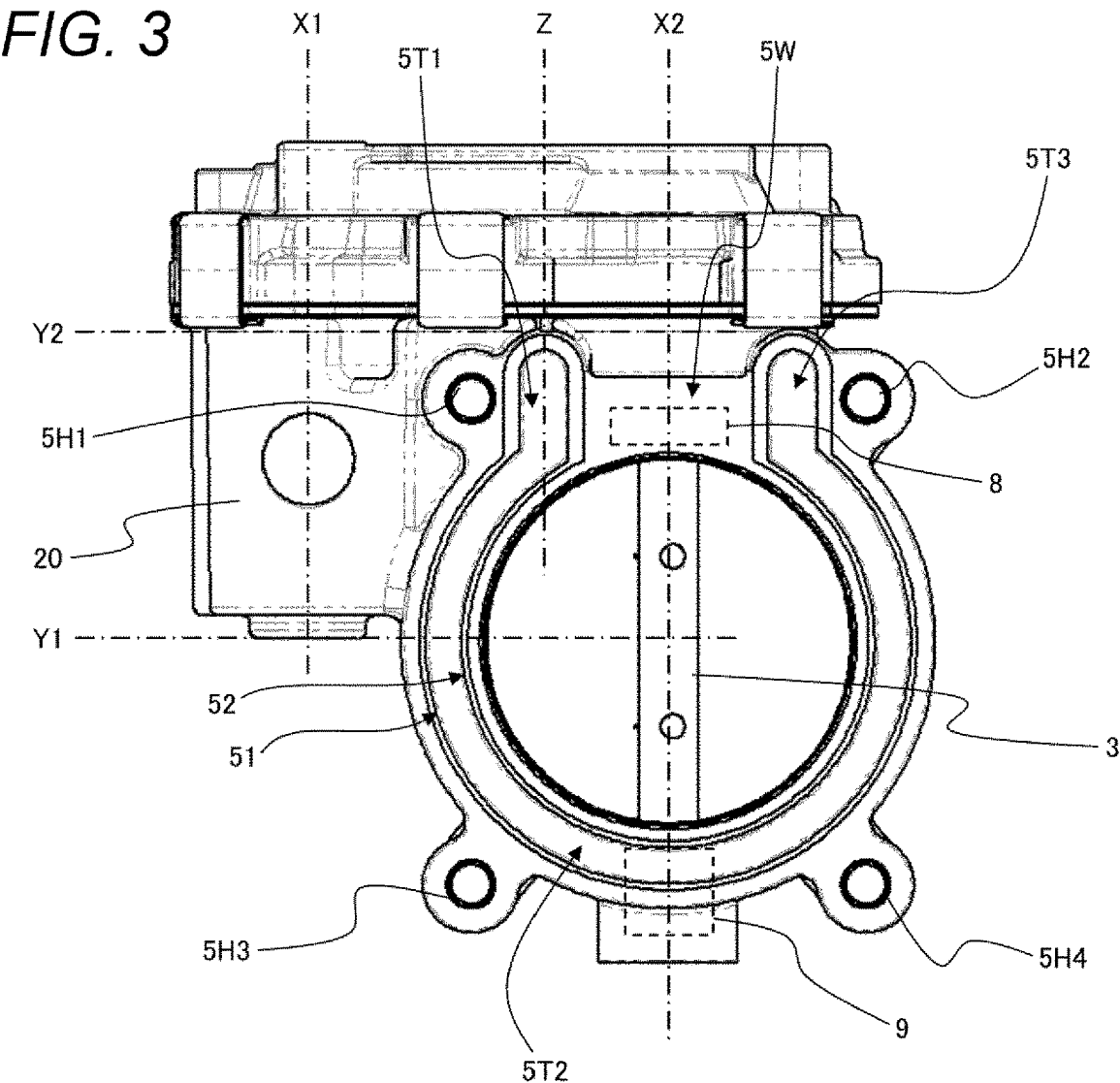
FIG. 3 is a plan view in which a plate of the motor-driven type throttle valve control device used in the gasoline engine vehicle is removed.
Figure 4:
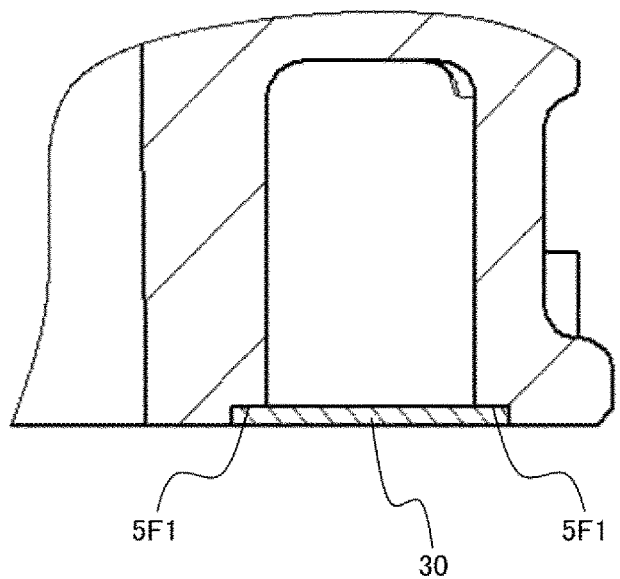
FIG. 4 is a cross-sectional view of a cooling water passage surrounded by a dotted line in FIG. 2.

FIG. 4 is a cross-sectional view of the cooling water passage surrounded by a dotted line A in FIG. 2. Plate mounting portions 5F1 and 5F2 having a width greater than the groove width are provided at the end portions of the groove portions 5T1 to 5T3 of the throttle body 5. The plate mounting portions 5F1 and 5F2 serve as bases for mounting the plate 30. After being disposed on the base, the plate 30 is coupled to the throttle body 5 by, for example, friction stir welding (FSW) to ensure airtightness of the cooling water passage.

Figure 5:
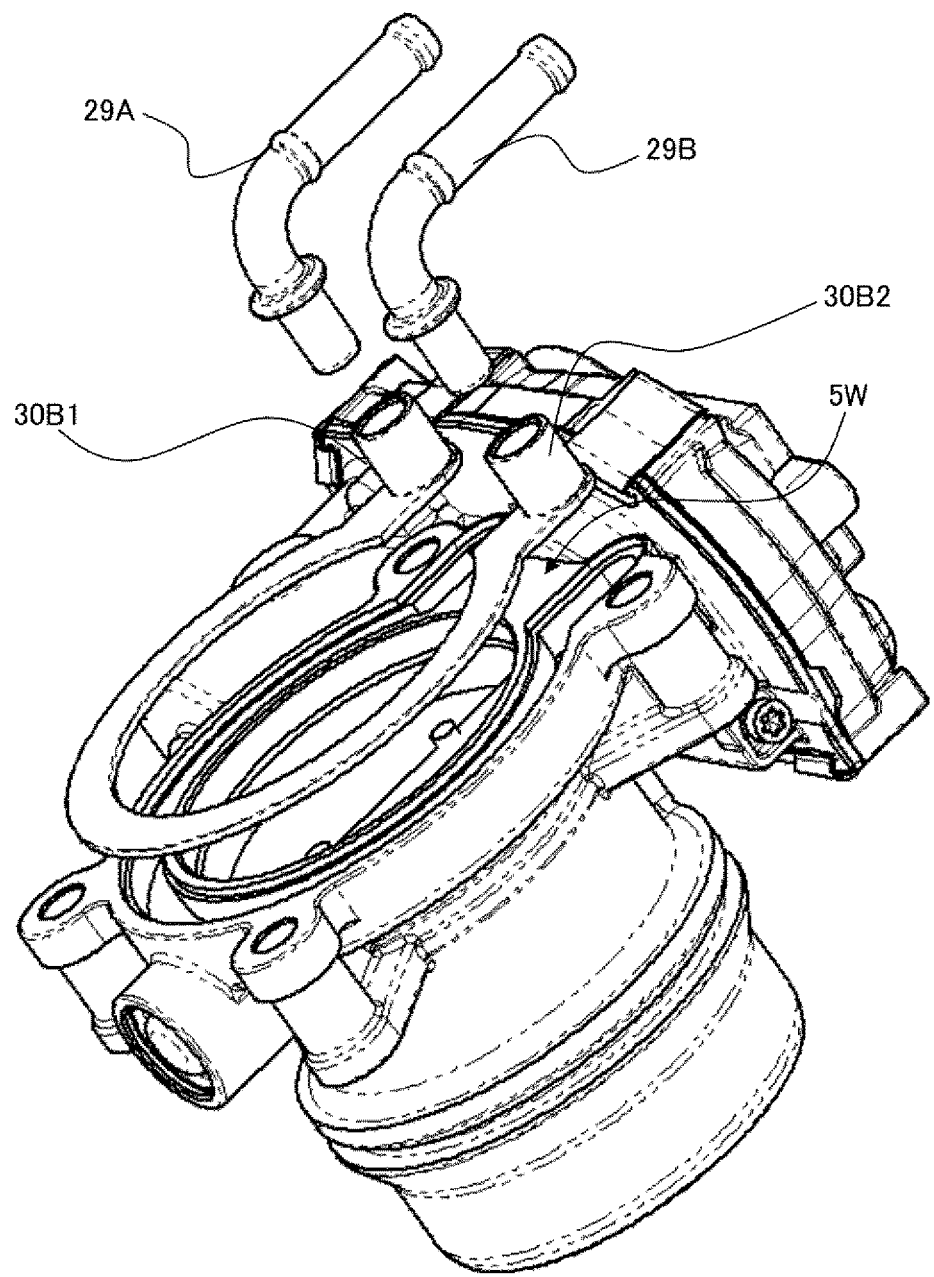
FIG. 5 is a partially exploded perspective view of a cooling water pipe coupling portion.

As illustrated in FIGS. 3 and 5, a wall portion 5W is disposed between the inlet-side cooling water pipe 29A and the outlet-side cooling water pipe 29B. The wall portion 5W prevents an occurrence of a situation in which cooling water directly flows from the inlet-side cooling water pipe 29A to the outlet-side cooling water pipe 29B without passing through the vicinity of an axial hole.

As illustrated in FIGS. 2 and 3, an inlet portion 5T1 and an outlet portion 5T3 of the cooling water passage are disposed in the vicinity of a bearing 8 to sandwich the bearing 8. This disposition makes it possible to cool a motor 20 that is a heat generation portion, in a state where a cooling water temperature is lower. In addition, since the cooling water passage does not overlap with the bearing 8, it is possible to avoid an increase in size of the throttle body.

In addition, an attachment hole 5H1 (body fixing portion) through which a bolt for attaching the throttle body 5 to an intake manifold passes is disposed between the inlet portion 5T1 of the cooling water passage and the motor 20. Four attachment holes 5H1 to 5H4 are provided, and the number of attachment holes may be three. At this time, it is necessary to provide an attachment hole between the inlet portion 5T1 of the cooling water passage and the motor 20 in order to ensure the earthquake resistance of the throttle body.

As described above, by disposing the inlet portion 5T1 and the outlet portion 5T3 of the cooling water passage to sandwich the bearing 8 having a larger diameter, it is possible to avoid an excessive increase in size of the throttle valve control device and to form a throttle valve control device that is compact and excellent in heat resistance.

Figure 8:
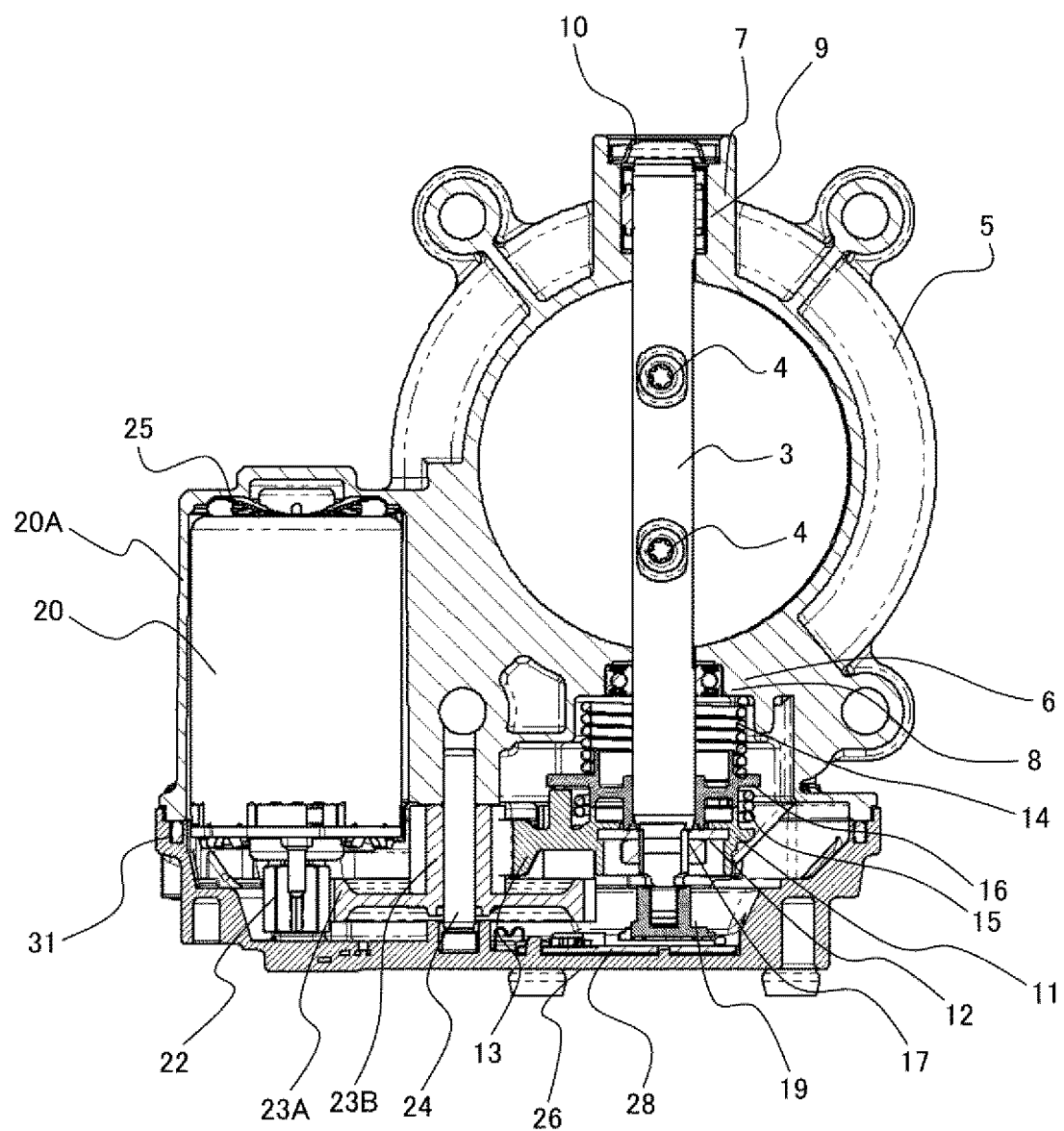
FIG. 8 is the cross-sectional view of the motor-driven type throttle valve control device used in the gasoline engine vehicle.

As illustrated in FIG. 8, the intake passage (referred to as the bore below) 1 and a motor housing 20A for storing and the motor 20 are molded together in a throttle valve assembly (referred to as the throttle body below) 5 made of die-cast aluminum.

In the throttle body 5, a rotation shaft (referred to as the throttle shaft) 3 made of metal is disposed along one diameter line of the bore 1. Both ends of the throttle shaft 3 are rotatably supported by ball bearings and needle bearings as bearings 8 and 9. The bearings 8 and 9 are press-fitted and fixed to bearing bosses 6 and 7 provided in the throttle body 5, respectively.

Further, the bearing 8 is press-fitted into the throttle body 5 after being press-fitted into the throttle shaft 3. Then, the movable amount of the throttle shaft 3 in an axial direction is restricted by being press-fitted and fixed to the throttle body 5. At this time, caulking may be used to fix the bearing 8. Thus, the throttle shaft 3 is rotatably supported with respect to the throttle body 5.

In the throttle shaft 3, a throttle valve 2 configured by a disk made of a metal material is inserted into a slit provided in the throttle shaft 3 and fixed to the throttle shaft 3 with a screw 4. Thus, when the throttle shaft 3 rotates, the throttle valve 2 rotates, and as a result, the cross-sectional area of the intake passage changes, and the intake air flow rate to the engine is controlled.

Figure 6:
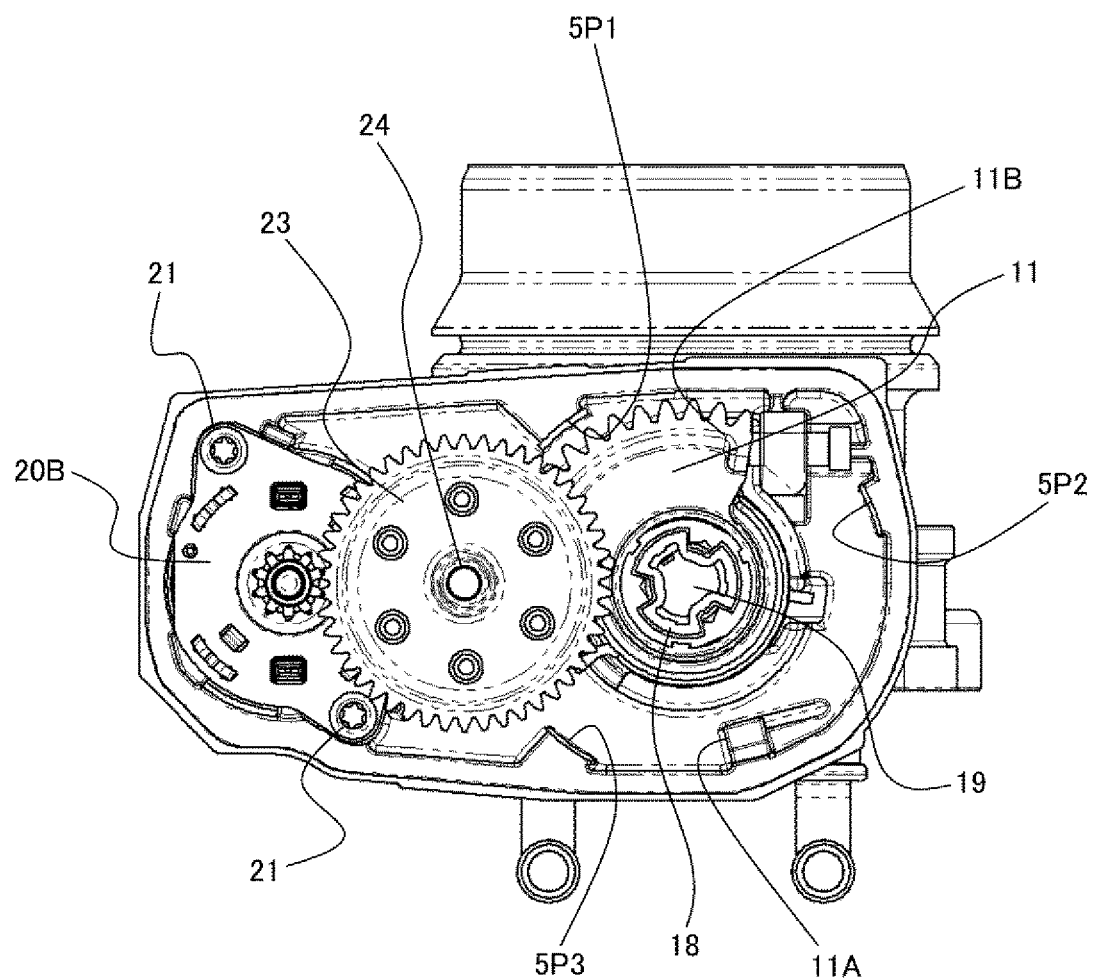
FIG. 6 is a plan view in which a gear cover of the motor-driven type throttle valve control device used in the gasoline engine vehicle is removed.

As illustrated in FIGS. 6 and 8, the motor housing 20A is formed substantially parallel to the throttle shaft 3. The motor 20 constituted by a brush-type DC motor is inserted into the motor housing 20A, and a flange portion of a bracket 20B of the motor 20 is fixed to a side wall of the throttle body 5 by screwing a screw 21. Further, as illustrated in FIG. 8, a wave washer 25 is disposed at an end portion of the motor 20 to hold the motor 20.

As illustrated in FIG. 8, the openings of the bearing bosses 6 and 7 are sealed by the bearings 8 and 9, respectively, to form a shaft seal portion and is configured to maintain airtightness. In addition, a cap 10 on the bearing boss 7 side prevents exposure of the end portion of the throttle shaft 3 and the bearing 9. This prevents leakage of air from the bearings 8 and 9 or leakage of grease for lubricating the bearings into the outside air or into a sensor room described later.

A gear 22 that is made of metal and has the smallest number of teeth is fixed to the end portion of the rotation shaft of the motor 20. A reduction gear mechanism and a spring mechanism for rotationally driving the throttle shaft 3 are collectively disposed on a side surface portion of the throttle body on a side where the gear 22 is provided. These mechanism portions are covered with a cover (referred to as a gear cover) 26 made of a resin material fixed to the side surface portion of the throttle body 5.

As illustrated in FIG. 8, a throttle gear 11 is fixed to an end portion of the throttle shaft 3 on the gear cover 26 side. The throttle gear 11 includes a metal plate 12 and a resin-made gear portion 13 formed on the metal plate 12 by resin molding. A cup-shaped recess portion is provided in a central portion of the metal plate 12, and a flange portion for gear molding is provided at an open-side end portion of the recess. The resin-made gear portion 13 is molded in the flange portion by resin molding.

The metal plate 12 has a hole in the center. A screw groove is formed around a tip portion of the throttle shaft 3. The tip of the throttle shaft 3 is inserted into the hole of the metal plate 12, and the metal plate 12 is fixed to the throttle shaft 3 by screwing a nut 17 into a screw portion. Thus, the metal plate 12 and the resin-made gear portion 13 formed on the metal plate 12 rotate integrally with the throttle shaft 3.

A default spring 15 formed of a helical spring is sandwiched between the back surface of the throttle gear 11 and a default lever 16. In addition, a return spring 14 formed of a helical spring is sandwiched between the back surface of the default lever 16 and the side surface of the throttle body 5. The two springs are drawn in an opening direction and a closing direction to form a default mechanism that defines the opening degree of the throttle valve to a predetermined opening degree (referred to as a default opening degree below) when the energization of the motor is turned OFF.

Since the present embodiment relates to a throttle valve control device for a gasoline engine vehicle, an initial position of the throttle valve 2, that is, an opening degree position to which the throttle valve 2 is set as an initial position when the power supply of the motor 20 is cut off is a default opening degree. Therefore, when the throttle valve 2 is opened more than the default opening degree, a load in the closing direction toward the default opening degree acts by the return spring 14, and when the throttle valve 2 is closed more than the default opening degree, the load in the opening direction toward the default opening degree acts by the default spring 15.

An intermediate gear 23 rotatably supported by a gear shaft 24 that is made of a metal material and is press-fitted and fixed to the side surface of the throttle body 5 is meshed between the gear 22 attached to the rotation shaft of the motor 20 and the throttle gear 11 fixed to the throttle shaft 3. The intermediate gear 23 includes a large-diameter gear 23A meshing with the gear 22 and a small-diameter gear 23B meshing with the throttle gear 11. Both gears are integrally molded by resin molding. These gears 22, 23A, 23B, and 11 constitute a two-stage reduction gear mechanism. Thus, the rotation of the motor 20 is transmitted to the throttle shaft 3 via the reduction gear mechanism.

Figure 7:
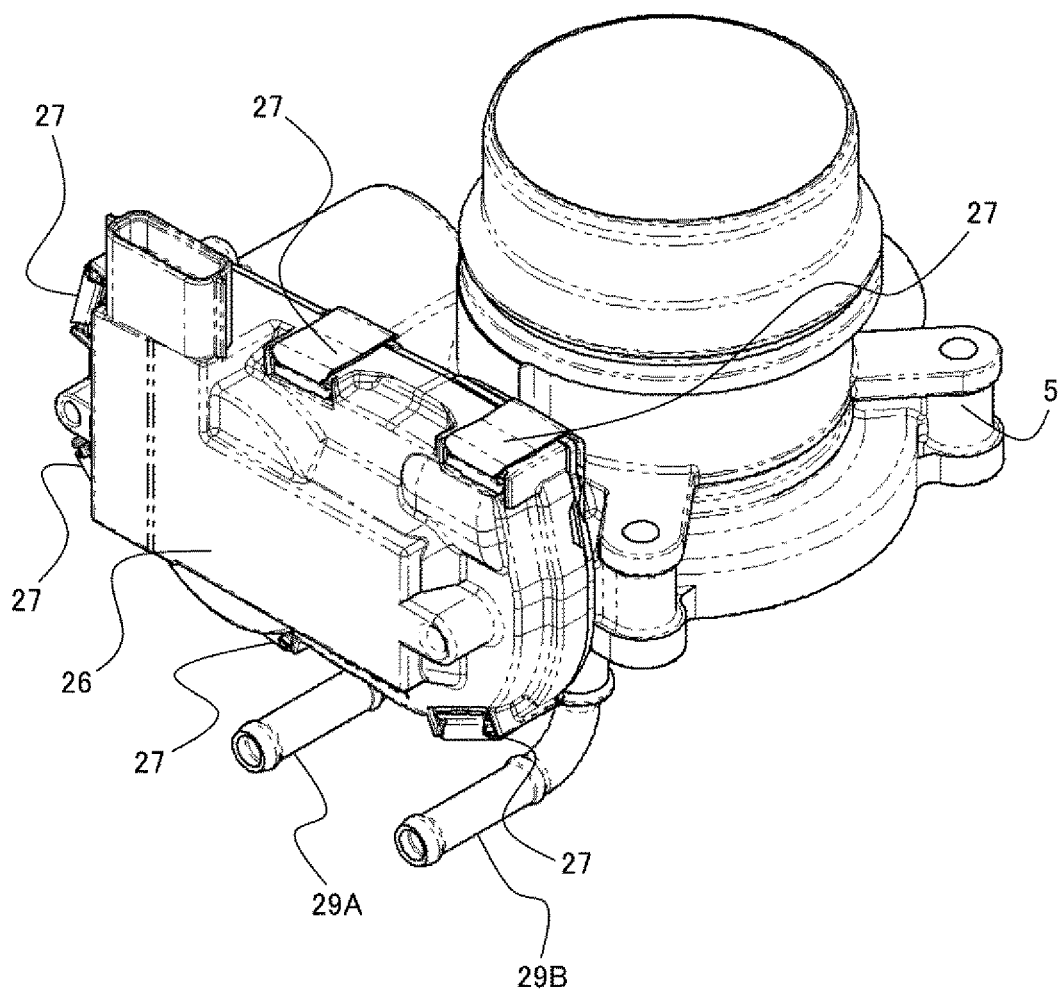
FIG. 7 is an external perspective view of the motor-driven type throttle valve control device used in the gasoline engine vehicle.

The speed reduction mechanism and the spring mechanism are covered with the gear cover 26 made of a resin material. A groove into which a seal member 31 is inserted is formed at a peripheral edge of the gear cover 26 on an opening end side. When the gear cover 26 is put on the throttle body 5 in a state where the seal member 31 is attached to the groove, the seal member 31 comes into close contact with an end surface of a frame around a gear housing chamber formed on the side surface of the throttle body 5 to shield the inside of the gear housing chamber from the outside air. As illustrated in FIG. 7, in this state, the gear cover 26 is fixed to the throttle body 5 with six clips 27.

A rotation angle detection device (throttle sensor) formed between the reduction gear mechanism configured as described above and the gear cover 26 covering the reduction gear mechanism will be specifically described below.

As illustrated in FIG. 8, a resin holder 19 is integrally molded and fixed to an end portion of the throttle shaft 3 on the gear cover side. A conductor 18 formed by press working is integrally molded and attached to the flat portion at the tip of the resin holder 19. Therefore, when the motor 20 rotates and the throttle valve 2 rotates, the conductor 18 also rotates integrally.

A TPS board 28 is fixed to the gear cover 26 at a position facing the conductor 18. An ASIC disposed on the TPS board detects the angle of the conductor 18 to detect the opening degree of the throttle valve 2 and to supply the opening degree to an ECU as a sensor output.

5P1 to 5P3 disposed in the throttle body 5 are walls for positioning the gear cover 26. By locking positioning protrusions of the gear cover 26 to the three walls, the TPS board 28 and the rotating-side conductor 18 are positioned, and can output a signal within a required allowable range. A full-open stopper 11A mechanically determines a full-open position of the throttle gear 11, and includes a protrusion integrally formed on the side wall of the throttle body.

Since a cutout terminal portion of the throttle gear 11 abuts on the protrusion, it is not possible for the throttle shaft 3 to rotate beyond a full-open position.

A full-close stopper 11B restricts a full-close position of the throttle shaft 3, and prevents collision of a terminal of the throttle gear 11 on an opposite side with the full-close stopper 11B at the full-open position and rotation of the throttle shaft 3 beyond the full-close position.

By applying the cooling water passage in the present invention to the throttle valve control device formed in this manner, it is possible to obtain a throttle valve control device that is compact and excellent in heat resistance. The groove portions 5T1 and 5T3 forming the cooling water passage are close to the bearing 8, and have a function of cooling the bearing 8 by transferring heat to the throttle body 5. Further, the groove portion 5T2 is close to the bearing 9, and has a function of cooling the bearing 9 by transferring heat to the throttle body 5. In addition, since the groove portions 5T1 to 5T3 annularly surrounds the bore 1, it is possible to reduce a risk of sticking the throttle valve 2 and the bore 1 to each other by making the thermal deformation of the bore 1 be uniform.

According to the embodiment described above, the groove portions 5T1 to 5T3 integrally formed with the throttle body 5 are disposed adjacent to the peripheral walls of the bearing bosses 6 and 7 of the throttle body 5 as a member for fixing the bearings 8 and 9 pivotally supporting the throttle shaft 3. 5T1 to 5T3 and the plate 30 form the cooling water passage. As a result, it is possible to carry heat transferred from the bearing via the bearing bosses 6 and 7 (or heat intended to be transferred to the bearing) away to the outside of the throttle body by engine cooling water.

Specifically, an outer wall 52 is integrally formed on at least a portion of an outer side of an inner wall 51 of the intake passage 1 (bore 1) through which intake air passes. The inlet-side cooling water pipe 29A that guides engine cooling water to a space (groove portions 5T1 to 5T3) formed between the inner wall 51 and the outer wall 52 communicates with the outlet-side cooling water pipe 29B that discharges the heated engine cooling water from the space (groove portions 5T1 to 5T3). In addition, the space (groove portions 5T1 to 5T3) is integrally formed to be able to transmit heat to the periphery of a pair of bearings 8 and 9 of the throttle shaft 3 extending through the intake passage 1 (bore 1).

Thus, since it is possible to integrally mold the bearing bosses 6 and 7 and the groove portions 5T1 to 5T3 as the cooling water passage with the throttle body 5 by aluminum die-casting, the manufacturing is simple.

Specifically, the inlet-side cooling water pipe 29A and the outlet-side cooling water pipe 29B are located to face the pair of bearings 8, and bosses 30B1 and 30B2 for press-fitting and fixing the inlet-side cooling water pipe 29A and the outlet-side cooling water pipe 29B are formed integrally with the plate 30. By providing the bosses 30B1 and 30B2 for press-fitting and fixing on the plate 30 side, an occurrence of a situation in which the shape of the throttle body 5 is complicated and another member is disposed is avoided.

In the present embodiment, the hard configuration of the throttle body 5 corresponding to a high intake air temperature has been described. Control measures when the throttle body 5 in the present embodiment is adopted will be described below.

The temperature of the throttle body 5 in the present embodiment is maintained at a constant temperature by the cooling water, but the temperature of the throttle valve 2 changes due to a change in the intake air temperature. Therefore, the size of the throttle valve 2 changes due to thermal expansion due to a change in the intake air temperature. At this time, when the diameter of the throttle valve 2 is large due to expansion at a high temperature, the cooling water temperature is low, and the bore diameter of the throttle body 5 is small, there is a risk that the bore 1 and the throttle valve 2 are stuck when the throttle valve 2 is closed to full-close by fully closing learning. A learning method is changed in accordance with the temperature condition so that such an event does not occur. Specifically, the bore diameter of the throttle body 5 is estimated by the cooling water temperature acquired from a water temperature sensor, and the valve diameter is estimated by the intake air temperature acquired from the intake air temperature sensor, thereby determining whether or not learning can be performed and an abutting force during learning.

Specifically, when the bore diameter of the throttle body 5 is small and the valve diameter is large, the learning is not performed or the abutting force during learning is reduced. At this time, the bore diameter and the valve diameter may be estimated from operating conditions.

In addition, since the bore diameter of the throttle body 5 and the valve diameter of the throttle valve 2 change depending on the temperature condition, the relationship between the acquired temperature and the full-close angle during the full-close learning is held and used to correct a target opening degree in accordance with the operating condition, thereby improving the control accuracy of the amount of air.

Specifically, when the bore diameter and the valve diameter change depending on the temperature, even though the throttle valve 2 is opened at the same opening degree, the opening area changes, so that the flow rate changes. The amount of change in the opening area is estimated from the intake air temperature and the cooling water temperature, and the target opening degree is corrected in accordance with the amount of change. In order to improve the accuracy of this correction, the full-close angle obtained by learning and the estimated temperatures of the throttle body 5 and the throttle valve 2 are used.

At this time, it is necessary to properly learn the angle of the full-close state for the full-close learning. Thus, when there is no risk of sticking the throttle body 5 and the throttle valve 2, learning is performed by properly applying the pressing force for closing the throttle body 5 and the throttle valve 2 by fully closing. Here, the timing of learning is a timing at which there is no risk of sticking the bore 1 and the throttle valve 2 as estimated from the intake air temperature and the cooling water temperature, but Key On learning may be used instead of Key Off learning. In addition, when the throttle valve 2 is set so that a pulling force for opening the throttle valve 2 from the full-close position is larger than the pressing force applied to the full-close position at the time of learning, it is possible to open the throttle valve 2 without sticking even when the bore 1 and the throttle valve 2 come into contact with each other.

On the other hand, it is also possible to remove deposits adhering to the throttle body 5 by using the temperature difference between the bore 1 and the throttle valve 2. When the intake air temperature is high and the valve diameter is large, it is estimated that the temperature of the deposit is also high and the deposit is soft. At this time, it is possible to peel the deposit off from the bore 1 by closing the throttle valve 2 in a state where the valve diameter is large. Also at this time, it is desirable to set the pulling force for peeling off the valve to be stronger than the pressing force for pressing the throttle valve 2 to be fully closed so that the throttle valve 2 does not stick to the deposit.

SUMMARY

In the present embodiment, the throttle valve control device includes the throttle body 5 in which the intake passage 1 through which intake air flows is formed, the throttle valve 2 that adjusts an amount of air passing through the intake passage 1, the throttle shaft 3 fixed to the throttle valve 2, and the first bearing 8 and the second bearing 9 that rotatably support the throttle shaft 3. The flow paths 5T1 to 5T3 through which the heat exchange medium (cooling water) flows is formed in the throttle body 5. The diameter of the first bearing 8 is greater than the diameter of the second bearing 9. The flow paths 5T1 to 5T3 are disposed along the outer periphery of the intake passage 1 to overlap with the second bearing 9 when viewed from the flow direction of the intake passage 1. The inlet portion 5T1 and the outlet 5T2 of the flow paths 5T1 to 5T3 are disposed to sandwich the first bearing 8.

According to the present embodiment configured as described above, the flow paths 5T1 to 5T3 through which the heat exchange medium flows are disposed along the outer periphery of the intake passage 1 to overlap with the second bearing 9 when viewed from the flow direction of the intake passage 1. Thus, it is possible to uniformly cool the outer periphery of the intake passage 1 and effectively cool the second bearing 9. In addition, since the inlet portion 5T1 and the outlet portion 5T3 of the flow paths 5T1 to 5T3 are disposed to sandwich the first bearing 8, it is possible to effectively cool the first bearing 8. In addition, since the flow paths 5T1 to 5T3 are disposed not to overlap with the first bearing 8 having a large diameter, it is possible to prevent an increase in the dimension of the throttle body 5 in the flow direction of the intake passage 1.

The throttle valve control device according to the present embodiment includes the motor 20 that drives the throttle shaft 3, and the first bearing 8 is disposed closer to the motor 20 than the second bearing 9. As a result, the distance from the inlet portion 5T1 of the cooling water passage to the motor 20 is reduced, so that it is possible to improve the cooling efficiency of the motor 20.

The throttle valve control device according to the present embodiment includes the motor 20 that drives the throttle shaft 3 and the body fixing portion 5H1 for fixing the throttle body 5. The body fixing portion 5H1 is disposed between a straight line X1 passing through the rotation axis of the motor 20 and a straight line Z that is parallel to the rotation axis of the throttle shaft 3 and passes through one of the inlet portion 5T1 and the outlet portion 5T2 closer to the motor 20 when viewed from the flow direction of the intake passage 1. This makes it possible to improve the earthquake resistance of the throttle body 5.

Further, when viewed from the flow direction of the intake passage 1, the body fixing portion 5H1 in the present embodiment is disposed between a straight line X1 passing through the rotation axis of the motor 20 and a straight line X2 passing through the rotation axis of the throttle shaft 3, and between a straight line Y1 passing through the non-output side end surface of the motor 20 and a straight line Y2 passing through the end surface of the throttle body 5 on the first bearing 8 side. This makes it possible to improve the earthquake resistance of the motor 20.

The inlet portion 5T1 of the flow paths 5T1 to 5T3 in the present embodiment is disposed closer to the motor 20 than the outlet portion 5T3. As a result, since the heat exchange medium (cooling water) passes through the vicinity of the motor 20 in a state where the temperature is relatively low, it is possible to improve the cooling efficiency of the motor 20.

Second Embodiment

Figure 9:
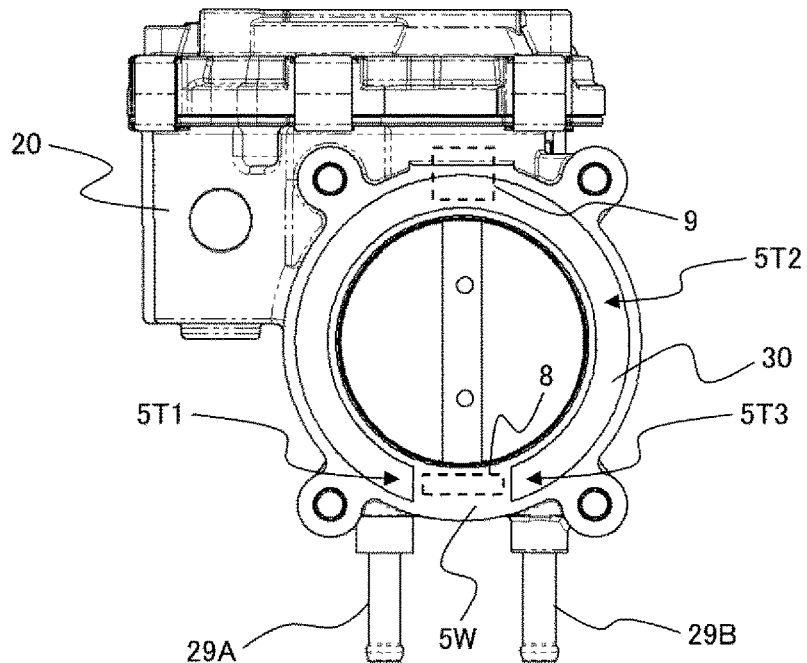
FIG. 9 is a plan view of a motor-driven type throttle valve control device used in a gasoline engine vehicle.
Figure 10:
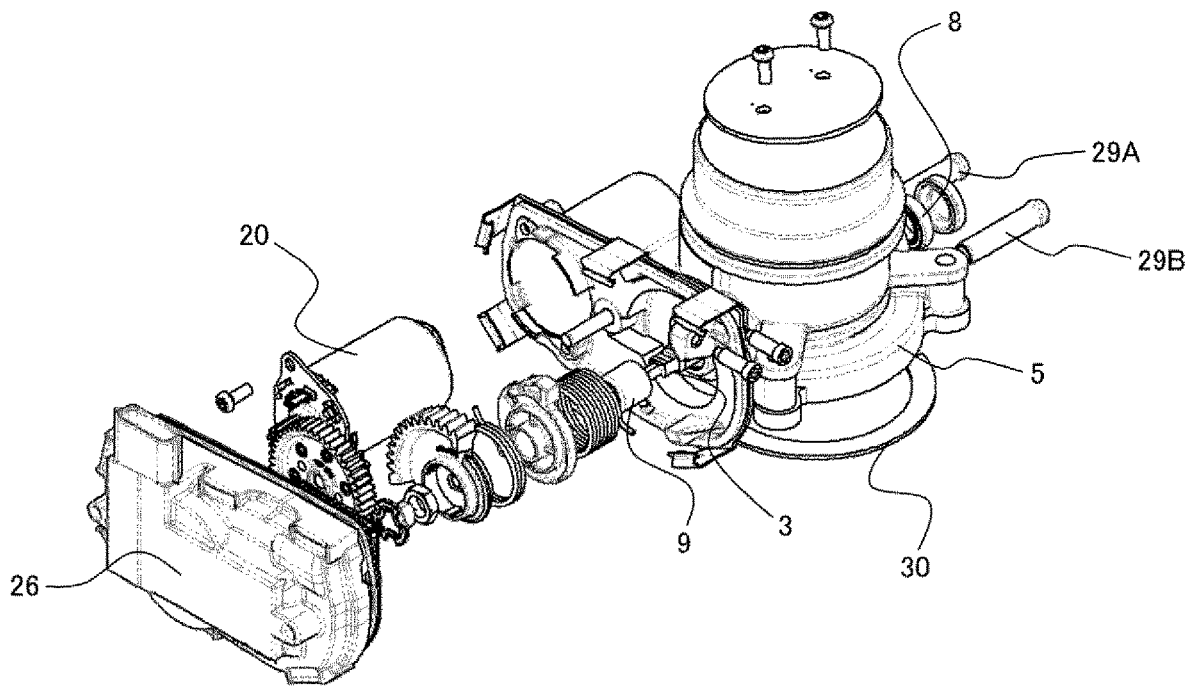
FIG. 10 is an exploded perspective view of the motor-driven type throttle valve control device used in the gasoline engine vehicle.

A valve control device according to a second embodiment of the present invention will be described with reference to FIGS. 9 and 10.

In the present embodiment, of the bearings 8 and 9 holding the throttle shaft 3, the bearing 8 disposed on the opposite side of the gear cover 26 with the intake passage 1 interposed between the gear cover 26 and the bearing 8 has a larger diameter. Therefore, the inlet portion 5T1 and the outlet portion 5T2 of the cooling water passage are disposed so as to sandwich the bearing 8 having a larger diameter. The inlet portion 5T1 of the cooling water passage is disposed closer to the motor 20 than the outlet portion 5T3. As a result, since the heat exchange medium (cooling water) passes through the vicinity of the motor 20 in a state where the temperature is relatively low, it is possible to improve the cooling efficiency of the motor 20.

Also in the present embodiment configured as described above, similarly to the first embodiment, it is possible to effectively cool the first bearing 8 and the second bearing 9 of the throttle shaft 3 while preventing the increase in size of the throttle body 5.

Hitherto, one embodiment of the present invention has been described in detail above, but the present invention is not limited to the above-described embodiment, and includes various modifications. For example, the above-described embodiment applies the present invention to a motor-driven type throttle valve control device for a gasoline engine vehicle, but can also be applied to a motor-driven type throttle valve control device for a diesel engine vehicle. In addition, the present invention can also be applied to a throttle valve control device for a mechanical engine. Furthermore, the present invention can also be applied to a throttle valve control device for an EGR gas control and a throttle valve control device for negative pressure generation.

REFERENCE SIGNS LIST 1 bore (intake passage)
2 throttle valve
3 throttle shaft
5 throttle body
5F1 plate mounting portion
5F2 plate mounting portion
5H1 attachment hole (body fixing portion)
5T1 groove portion (flow path, inlet portion)
5T2 groove portion (flow path)
5T3 groove portion (flow path, outlet portion)
5W wall portion
6 bearing boss
7 bearing boss
8 bearing (first bearing)
9 bearing (second bearing)
10 cap
11 throttle gear
11 gear
11A full-open stopper
11B full-close stopper
12 metal plate
13 resin-made gear portion
14 return spring
15 default spring
16 default lever
17 nut
18 conductor
19 resin holder
20 motor
20A motor housing
20B bracket
22 gear
23 intermediate gear
23A large-diameter gear
23B small-diameter gear
24 gear shaft
25 wave washer
26 gear cover
27 clip
28 TPS board
29A inlet-side cooling water pipe
29B outlet-side cooling water pipe
30 plate
30B1, 30B2 boss
31 seal member
51 inner wall
52 outer wall

The invention claimed is:

1. A throttle valve control device comprising:
a throttle body in which an intake passage through which intake air flows is formed;
a throttle valve that adjusts an amount of air passing through the intake passage;
a throttle shaft fixed to the throttle valve; and
a first bearing and a second bearing that are immediately adjacent to the intake passage and that rotatably support the throttle shaft,
a flow path through which a heat exchange medium flows being formed in the throttle body, wherein
a diameter of the first bearing is greater than a diameter of the second bearing,
the flow path is disposed along an outer periphery of the intake passage to overlap with the second bearing when viewed from a flow direction of the intake passage, and
an inlet portion and an outlet portion of the flow path are disposed to sandwich the first bearing.

2. The throttle valve control device according to claim 1, further comprising a motor that drives the throttle shaft, wherein the first bearing is disposed closer to the motor than the second bearing.

3. The throttle valve control device according to claim 1, further comprising:
a motor that drives the throttle shaft; and
a body fixing portion for fixing the throttle body,
wherein the body fixing portion is disposed between a straight line passing through a rotation axis of the motor and a straight line that is parallel to a rotation axis of the throttle shaft and passes through one of the inlet portion and the outlet portion closer to the motor when viewed from the flow direction of the intake passage.

4. The throttle valve control device according to claim 1, further comprising:
a motor that drives the throttle shaft; and
a body fixing portion for fixing the throttle body,
wherein the body fixing portion is disposed between a straight line passing through a rotation axis of the motor and a straight line passing through a rotation axis of the throttle shaft, and between a straight line passing through a non-output side end surface of the motor and a straight line passing through an end surface of the throttle body on a first bearing side, when viewed from the flow direction of the intake passage.

5. The throttle valve control device according to claim 1, further comprising a motor that drives the throttle shaft, wherein the inlet portion is disposed closer to the motor than the outlet portion.

\* \* \* \* \*